United States Patent [19]

Eberle

[11] Patent Number: 4,509,253

[45] Date of Patent: Apr. 9, 1985

[54] METHOD FOR MANUFACTURE OF A STORAGE BATTERY

[76] Inventor: Kelly L. Eberle, 738 Northern Rd., S. Daytona, Fla. 32019

[21] Appl. No.: 614,067

[22] Filed: May 25, 1984

Related U.S. Application Data

[63] Continuation-in-part of Ser. No. 369,054, Apr. 16, 1982, abandoned.

[51] Int. Cl.³ .............................................. H01M 6/00
[52] U.S. Cl. ................................. 29/623.1; 29/623.2; 29/730
[58] Field of Search .................... 29/623.1, 623.2, 730; 429/160

[56] References Cited

U.S. PATENT DOCUMENTS 3,261,719  7/1966  Shannon .............................. 136/134
3,518,127  6/1970  Aronson .............................. 136/134
3,915,751 10/1975  Sanekata ........................... 136/135 S

*Primary Examiner*—Charles F. LeFevour
*Attorney, Agent, or Firm*—William J. Scherback

[57] ABSTRACT

A storage battery and a method of making same wherein the positive plates of one cell are electrically connected to the negative plates of an adjacent cell without the need of welding. A conventional battery case is utilized and modified to provide an opening through the partitions between the cells. A conductive material, either lead particles or a low-melt alloy in molten form, is added in the cells and through the openings therebetween. The lugs of the positive plates of the cell are all positioned downward in the cell and are aligned with all the lugs of the negative plates in an adjacent cell. The conductive material electrically connects all the positive lugs of the one cell to the negative lugs of the adjacent cell. Where particulate material is utilized as the conductive material, a sealing agent, for example, epoxy resin, is poured onto the conductive material to render the material impermeable and to seal it in place. If desired, the conductive material can be sintered or even melted after addition to the battery case by applying external heat through the battery case.

13 Claims, 7 Drawing Figures

METHOD FOR MANUFACTURE OF A STORAGE BATTERY

CROSS REFERENCE TO RELATED APPLICATIONS

This application is a continuation in part of U.S. application Ser. No. 369,054 filed April 16, 1982 now abandoned.

BACKGROUND OF THE INVENTION

1. Field of the Invention

The present invention relates to storage batteries and more particularly relates to an improved storage battery and a method for assembling same which avoids many of the problems normally encountered in constructing conventional storage batteries.

2. Description of the Prior Art

Probably the most common rechargeable, storage battery in use today is the lead storage battery of the type used in automobiles, boats, stationary equipment, and the like. This battery is formed of individual cells which, in turn, are connected in series to provide a battery of desired voltage. Each cell is comprised of sets of positive plates of lead dioxide and sets of negative plates of metallic lead which are, respectively, coated on grids of metallic lead and prepared in a highly porous form to provide a maximum surface area for reaction with an electrolyte, for example, sulfuric acid. The positive and negative plates, formed with lugs thereon, are alternately stacked with electrical insulation provided by sheets of micro-porous polyvinyl chloride or treated fibers known as separators.

In a typical construction of conventional storage batteries, the plates and separators for each cell are stacked and the lugs on the positive plates and the lugs on the negative plates are, respectively, joined together by welding or the like to form a stacked unit. The stacked units are then placed in a "lugs up" position into respective cell compartments within a battery case which are defined by spaced partitions within the case. Next, the cells are electrically connected in series by welding connecting straps or the like between positive and negative lugs of adjacent cells.

As will be recognized by those skilled in the art of constructing batteries of this type, several major problems exist in using present techniques. These problems include (1) poor intra and inter cell welds; (2) burning due to welding operations; (3) cost of casting small parts needed in assembly; (4) misalignment of punched openings in partitions of the battery case; and (5) maintaining proper plate and separator alignment when forming the plates for each cell into a unit.

Assembly techniques have been proposed for avoiding some of the above mentioned problems. For example, U.S. Pat. No. 3,915,751 discloses a method where the positive and negative plates of each cell are pushed into a cell of a battery case in an unconnected "lugs up" position. A sealing agent, e.g. epoxy resin, is poured into individual compartments on a detached cover and the case is then placed upside down onto the cover so that the lugs on the positive and negative plates in the case are positioned into a respective compartment in the cover. The sealing agent is allowed to set and the battery is then turned right side up. Portions of the cover and of the sealing agent are milled away to expose the positive and negative lugs of adjacent cells. Molten metal, e.g. lead, is poured through the milled openings in the cover to thereby effect the necessary connections between cells. While this technique avoids some of the problems previously encountered in manufacturing of conventional storage batteries, it still requires additional assembly steps, e.g. accurate milling of the cover, which add to the cost and affect the reliability of the battery.

Another example of an assembly technique is described in U.S. Pat. No. 3,261,719 in which a bottom shell or base has formed therein cavities into which molten lead is poured. While the lead is in a molten state, stacks of battery plates and separators are placed lugs down into the molten lead and held in position until the lead solidifies. After the lead has solidified, a case or container is placed down over the stacked plates and into engagement with the base. The case is provided with spaced partitions which extend down from the top wall of the case and from sidewall to sidewall to provide the individual cells. The disadvantage of this type of assembly is readily apparent. The stacks of plates must be held in a vertical position and properly spaced one from the other while the lead is solidifying so that the container with the transversely extending partitions will fit over and accommodate or receive stacked plates. Any deviation from vertical will prevent the assembly of the battery. In addition, the seal between the bottom shell or base and the container is at a location below the acid level of the battery which increases the probability of acid leaking from the battery by way of defective seals to damage metal parts in the vicinity of the battery.

The present invention avoids many of the problems of the prior art assembly technique resulting in lower cost for assembly by utilizing fewer steps and providing a new and improved battery of increased reliability.

SUMMARY OF THE INVENTION

The present invention concerns itself with a method for manufacture of storage batteries of the type including a one-piece case integral below the acid level of the battery and having spaced partitions extending upward from the bottom of the case to define with walls of the case a plurality of liquid-tight cell compartments. Spaced rest ups extend upwardly respectively from the bottom of the case and transversely to the partitions to provide means for supporting lugged positive and negative plates of the battery. An opening is established in each partition adjacent the bottom portion thereof at one end of each partition and below the tops of the rest ups. The openings are established alternatively at the front and back of adjacent partitions between a sidewall of the case and an adjacent rest up to provide fluid communication between adjacent cell compartments. A mobile electrically conductive material is added to the ends of the cell compartments to a level below the tops of the rest ups and at least to the height of the openings for flow through the openings to establish beds of conductive material between adjacent cell compartments. A stack of battery plates is then placed in each cell compartment with the lugs of the plates located in the beds of conductive material. The lugs of the negative plates are located at one end of the cell compartment and the lugs of the positive plates of the same stack being located at an opposite end of that cell compartment.

The mobile electrically-conductive material is described in one specie of the invention as being a low-melt alloy which is added to the ends of the cell compartments in a molten state. In another specie of the method, the electrically-conductive material is comprised of finely divided particles of conductive material selected from the class consisting of lead, low-melt lead based alloys and copper.

In the course of assembling the battery, the stacks of plates and separators are added into the cell compartments and held in position by the partitions of the case while electrical contact is established between the lugs of the plates and the electrically-conductive material, thereby avoiding the problems inherent in one of the prior art assembly techniques of placing the casing over previously connected stacks of battery plates and separators and attempting to fit the stacks into their individual and respective cell compartments.

Where the mobile electrically-conductive material is comprised of finely divided particles of conductive material, it will be desirable to vibrate the case during the addition of the stacks of plates in order to facilitate the location of the lugs into the beds of conductive material. In addition, where the finely divided particles are utilized, there will inherently be some porosity and permeability through the beds. In order to avoid the flow of acid by way of the beds into adjacent cells, the beds are covered with a layer of a fluid impermeable material such as an epoxy resin.

The method of the present invention gives rise to a battery of high reliability produced with attendant savings in manufacturing costs.

DESCRIPTION OF THE PREFERRED EMBODIMENTS

Figure 1:
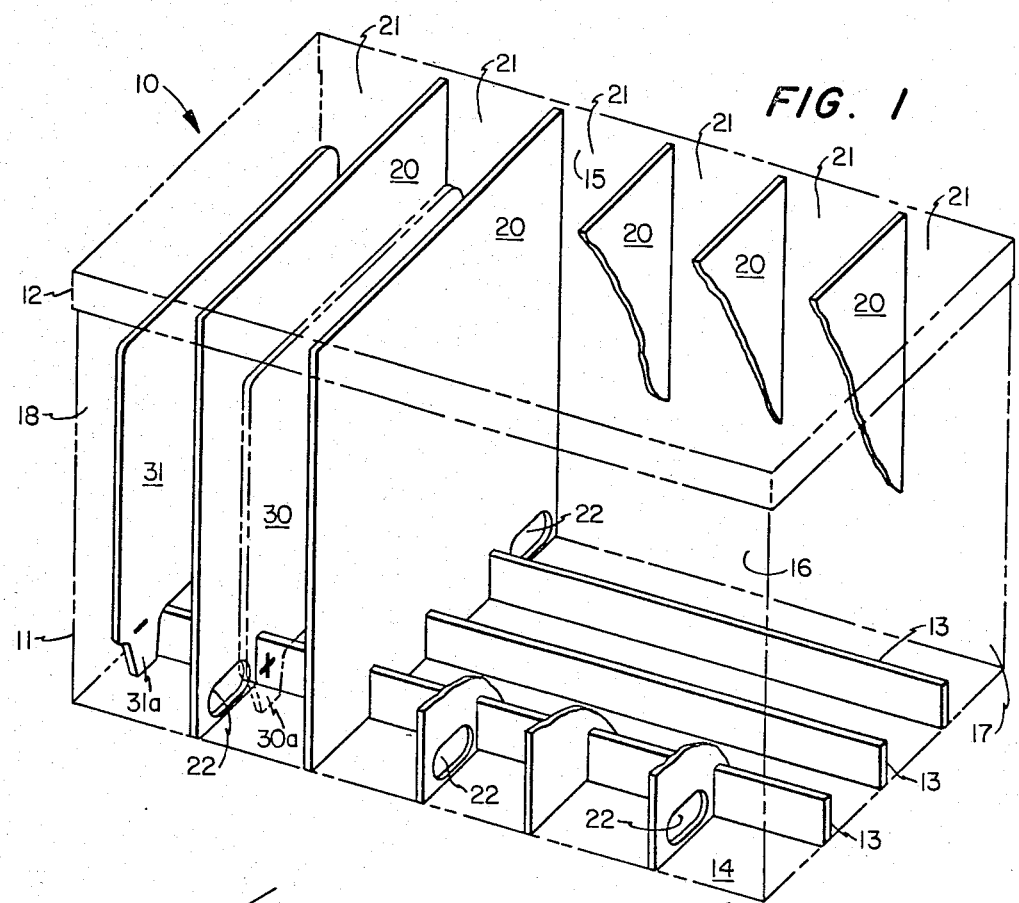
FIG. 1 illustrates a conventional battery case modified in accordance with the present invention.
Figure 3:
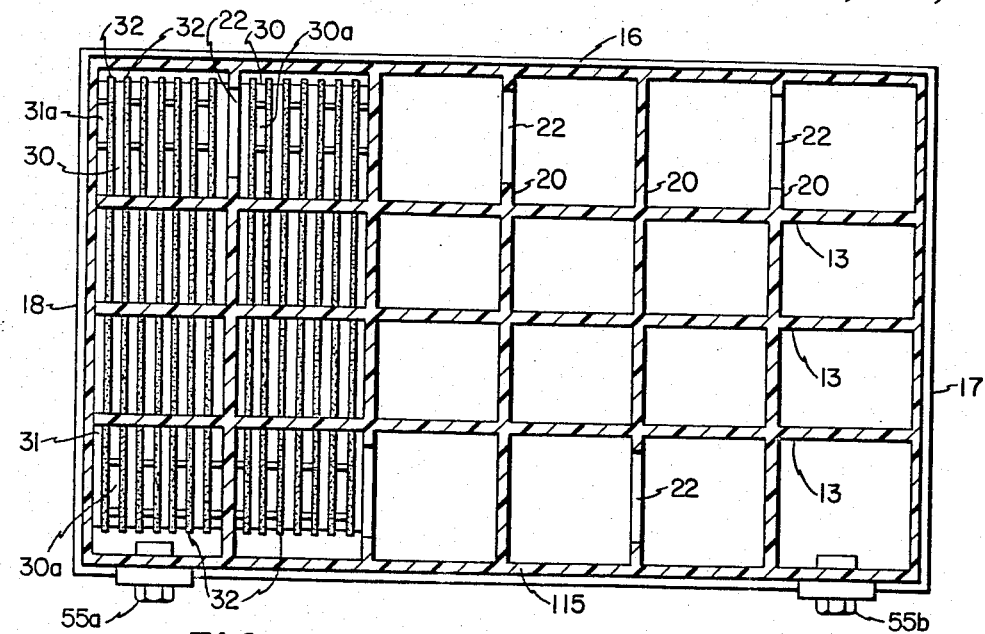
FIG. 3 is a sectional view taken along line 3—3 of FIG. 2.

Referring to FIGS. 1 and 3, a battery 10 is comprised of a conventional case 11 having a cover 12; the case and the cover being shown in phantom. Case 11 is molded in one piece to avoid any seams below the level of acid to later be added. A suitable material for the case may be rubber, polypropylene or the like. The case 11 as molded includes a plurality of rest ups 13 formed integrally with the bottom 14 of case 11 and extending parallel to sidewalls 15, 16 and from end wall 17 to end wall 18. Rest ups 13 are provided in conventional battery cases to space the plates in each from the bottom of the case so that any debris formed on the plates during operation will drop into receptacles or sumps formed between the tops of the rest ups 13 and the bottom 14 to avoid electrical shorting between the plates.

In the practice of the present invention, the rest ups 13 adjacent to sidewalls 15, 16 provide an additional function.

Case 11 also includes a plurality of partitions 20 molded therein which define individual fluid impermeable cell compartments 21. Six compartments 21 are shown in FIGS. 1 and 3 representative of a typical 12-volt battery. In the present invention, openings or passages 22 are formed through the lower portion of each partition 20 in an alternating back-front manner to establish fluid communication between adjacent compartments 21. These openings or passages 22 can be part of an original case design or can later be punched, cut or otherwise formed through the partitions. Preferably, the passages 22 are formed in a conventional battery case by inserting a heated rod (not shown) having a horizontally extending end portion, into each cell, pressing the end against the partition near the bottom thereof to melt through the partition. The passageways are then enlarged to form the illustrated configuration by moving the heated end from side to side between the sidewall 15 or 16 and the immediately adjacent rest up 13. It is important that the height of the passageways 22 do not extend above the tops of the rest ups 13.

Figure 2:
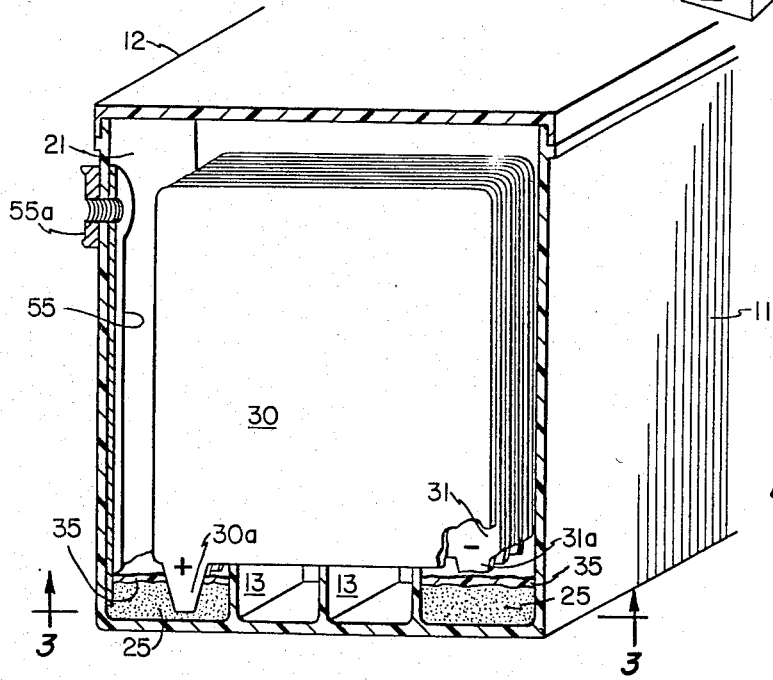
FIG. 2 is a partial view, partly in section, of an end view of a battery constructed in accordance with the present invention.

With the battery case 11 prepared to include passageways 22, a mobile, electrically-conductive material 25 (FIG. 2) is added into the receptacles formed in the lower portions of the compartments of case 11 formed by the walls 15-18, the base 14 and the partitions 20. The electrically-conductive material 25 can extend above the tops of the passageways 22, but must be below the tops of the rest ups 13. As the material 25 is added into the receptacles, it will be free to flow between the ends of two adjacent cell compartments through the openings 22 in the partitions 20. In so doing, there will be provided the necessary electrical connections or buses between the various cell compartments to enable the series connection of the stacks of battery plates to be added to the cell compartments 21.

The mobile material 25 can be selected from any material which will establish acceptable electrical contact between the plates when the battery is assembled. Examples of suitable material can be a low melt lead based alloy or finely divided particles of lead, lead alloy or copper.

After the mobile electrically-conductive material is added into the receptacles or compartments of the battery case 11, preassembled stacks comprised of positive plates 30, negative plates 31 and separators 32 are added into each compartment 21 of the case 11 (FIG. 3). The series of plates 30 and 31 are respectively fabricated with lugs 30a and 31a. The stacks of plates 30 and 31 and separators 32 are arranged alternately in the compartments 21 such that in a "lugs down" position, all the lugs 30a of the positive plates 30 are at one end of a cell compartment 21, whereas all the lugs 31a of the negative plates 31 are at an opposite end of the cell compartment. The orientation of the lugs is reversed in adjacent cell compartments 21 such that the negative plates of a stack in one cell compartment 21 may be electrically connected in series with the positive plates in an adjoining cell compartment 21 by way of the mobile, electrically-conductive material 25 extending through the passageways 22.

The stacks of positive and negative plates 30, 31 together with separators 32 are readily positioned into each cell and supported vertically therein by the partitions 20 while the lugs 30a, 31a are being positioned into contact with the mobile, electrically-conductive material 25 in the receptacles provided in the battery case. This avoids the prior art assembly technique which required that the stacks of plates be held in a vertical position to assure that the later addition of the upper portion of the battery case would readily receive the stacks of plates and separators after they had been fused to the molten metal previously poured into the base portion of the case.

Where the mobile electrically-conductive material is selected from the class of finely divided electrically-conductive particles, it will be desirable in assuring even distribution of the conductive material within the receptacles and to facilitate the placement of the plate lugs into the electrically-conductive material to vibrate the case during the filling of the receptacles with the material and during the placement of the lugs. The vibration may be accomplished by way of a shake table (not shown).

Further, in the instance where the mobile electrically-conductive material is particulate matter or finely divided lead, lead alloy or copper, there will be added a non-conductive sealing agent 35 as a layer over the beds of electrically-conductive material 25. The non-conductive sealing agent 35 is added following placement of the stacks of battery plates and separators into each cell. The sealing agent 35 flows over and into the layer of particulate matter to perform two functions. The first function is to seal the particulate matter in place to avoid shifting and possibly slopping over into the adjoining space defined by the rest ups 13. The second function is to seal off the particulate matter and thereby prevent acid from flowing through the porous and permeable mass provided by the particulate matter from one cell into an adjoining cell which would otherwise result in an inoperable battery. Sufficient sealing agent 35 is added to assure that the upper level of the sealing agent is at least even with or above the top of each of the passageways 22.

The non-conductive sealing agent may be an epoxy resin. The curing time for the epoxy resin may be accelerated by applying heat to the case either during or after the addition of the epoxy resin.

Another specie of the method of the present invention utilizes as the mobile electrically-conductive material a low melt lead alloy which is added to the receptacles in the base of the case 11 in the manner described in conjunction with the addition of the particulate material. While the lead alloy is still in a molten condition, the stacks of battery plates 30, 31 and separators 32 are added with the lugs down. Following the addition of the stacks of plates 30, 31 and separators 32, the molten low-melt lead alloy is permitted to cool and solidify to form a rigid mechanical and electrical connection with the lugs 30a, 31a of the various battery plates 30, 31.

Figure 5:
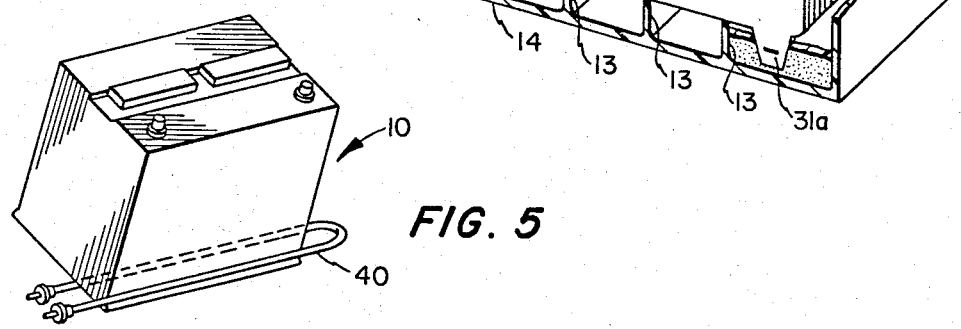
FIG. 5 is a perspective view of a battery of the present invention illustrating one mode of applying heat to a portion of the bottom of the battery in order to fuse the mobile, electrically-conductive material in the base of the battery.

A similar rigid mechanical and electrical connection may be had with the particulate matter by applying heat through the cell wall to at least sinter the finely divided particles together into a single mass. Such an operation is illustrated in FIG. 5 wherein one edge of the battery case 10 is shown encompassed by the coil 40 of an induction heater, the electromagnetic energy from which will heat the metal particles to the exclusion of the plastic case and at least sinter the particles together. When the sintering is effected, there is still the need to include the non-conductive layer of epoxy resin 35 over the sintered beds of electrically-conductive material. Sintering will not create a solid body and there will most likely be present the characteristics of permeability to liquids, which condition must be avoided for proper battery operation. On the other hand, if the particles are of a low-melt lead alloy, then the application of the energy from the induction heater will cause the particles of alloy to actually melt to form a solid body upon cooling and thereby obviate the need of the epoxy sealant provided, however, that height of the bed of conductive material exceeds the top of the passageways through the partitions.

Figure 6:
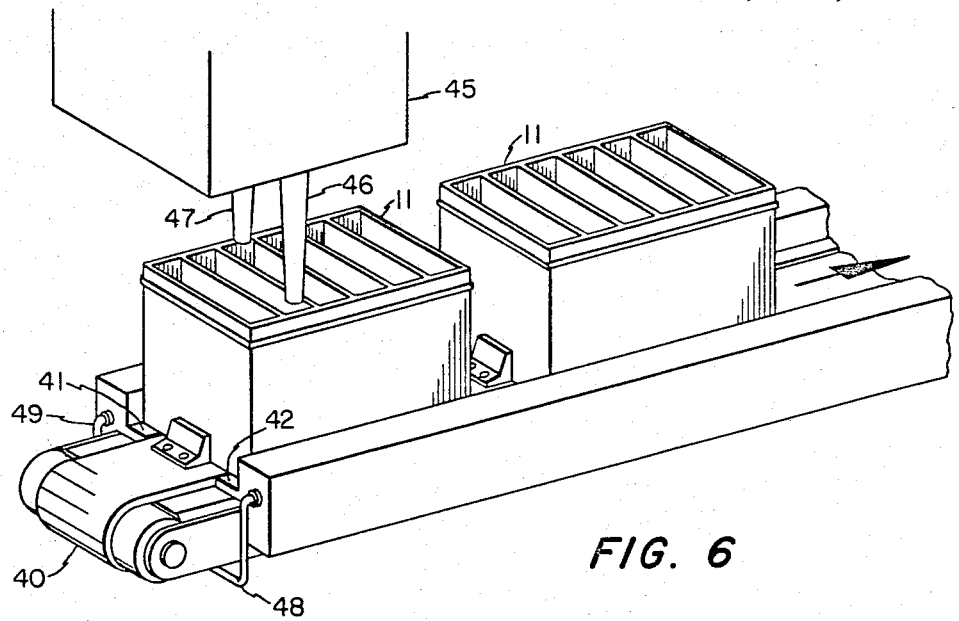
FIG. 6 illustrates apparatus for adding mobile electrically-conductive material in a molten state to the batteries while applying heat to selected portions of the bottom of the battery in order to maintain the material in a molten state during assembly of the battery.

One technique of implementing the procedure of utilizing a low-melt alloy in liquid form is illustrated in FIG. 6. There the battery cases 11 are placed on a conveyor belt 40 and moved in the direction of the arrow. The edges of the battery cases 11 rest upon rails 41 and 42 which are heated, and that heat transmitted to the base of the battery cases 11. As the battery cases move in a direction shown, they pass under a reservoir 45 of molten low-melt lead alloy. Under control of suitable mechanisms, the lead alloy is dispensed from the reservoir 45 by way of suitable tubes or nozzles 46 and 47 to add to the receptacles at the base of the cases 11 an aliquot of molten low-melt lead alloy. While only two tubes or nozzles 46, 47 have been illustrated, it will be understood that in the commercial embodiment of the system there will be an increased number of the nozzles equal to the number of receptacles to be loaded so that all receptacles can be loaded simultaneously.

The battery cases loaded with the molten low-melt lead alloy then continue to move in the direction shown by the arrow with the heat being transferred from the rails maintaining the alloy in a molten state. While in the molten state, the stacks of battery plates 30, 31 and separators 32 are added lugs down in a manner above-described. The battery cases loaded with the stacks of plates and separators are then removed from the heated conveyor and allowed to cool so that the molten alloy solidifies to form the rigid mechanical electrical bond desired as between the various cells of the battery. Conduits 48 and 49 signify that the heating of the rails may take place by way of steam or the conduits may represent shields for electrical conductors applied energy to heating elements associated with the rails 41 and 42.

A suitable low-melt lead alloy should have a melting point of around 210° fahrenheit. That being the case, the rails 41 and 42 should be heated to a temperature that does not exceed 225°. A much higher temperature would prove to be deleterious to the material comprising the battery cases 11. A specific example of a suitable alloy is one comprised of 8% cadmium, 40% bismuth and 52% lead.

Figure 7:
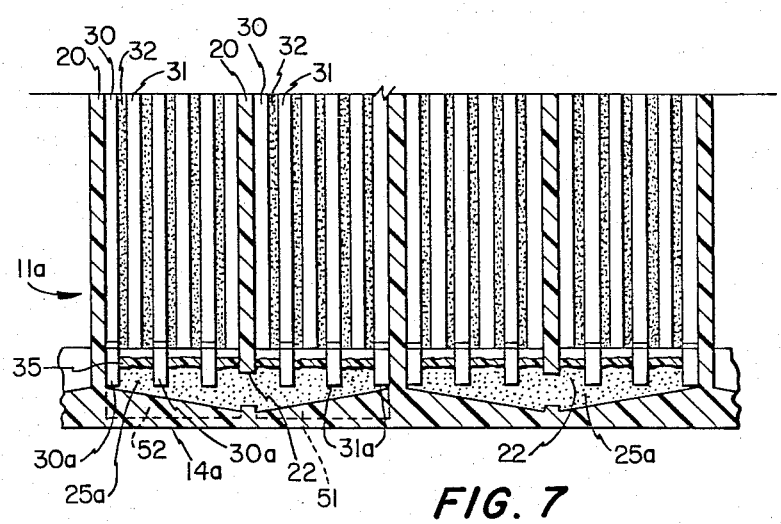
FIG. 7 is a partial cross-sectional view of a modification of the battery in which the beds of electrically-conductive material are at a maximum at the location of the passageway through the partition and tapered to a minimum depth to realize further savings in the cost of battery construction.

A significant savings in material may be realized by employing the modification illustrated in FIG. 7. FIG. 7 is a partial cross-section of a case 11a illustrating the series of positive and negative plates 30, 31 with their respective lugs 30a, 31a embedded in a layer of particulate matter 25a. The particulate matter 25a is most thick, or is at a maximum thickness at a partition 20 with a passageway 22 and thereafter tapers to a minimum thickness at opposite ends of the bed. To achieve the configuration shown, the base 44a of the battery case 11a may be molded with the V-shape configuration illustrated. On the other hand, the same configuration may be achieved by adding to existing battery cases wedge-shaped inserts 51, 52 outlined by dotted lines. Such a configuration is effective inasmuch as the plates at one end of a given cell are connected in parallel and the flow of current accumulates and becomes a maximum at the vicinity of the partition with the passageway therethrough. Since current flow is at a minimum within the cell at a point remote from the passageway there is no need to have a uniform distribution of conductive material in the receptacle. Hence, the design provides for effective low resistance conductivity of current while at the same time realizing savings in the material utilized in the fabrication of the battery.

Where a sidewall terminal battery (FIG. 2) is manufactured in accordance with the present invention, a strap 55 of conductive material, for example lead, is preassembled into each end compartment 21 (only one shown) of the case 11; one end compartment providing the positive terminal 55a of battery 10 and the other end compartment providing the negative terminal 55b (FIG. 3). The strap 55 extends from near the lower portion of end compartment 21 and terminates at the terminal 55a. The lower end of the strap 55 is positioned into the bed of conductive material 25 and thereby electrically connects the sidewall terminals to the battery cells. The sidewall terminals are typically mounted and secured during the fabrication of the conventional sidewall terminal battery case where fabrication techniques provide for a fluid-tight seal through the side of the battery case. If desired, the strap 55 may be added during the fabrication of the battery case in conjunction with the addition of the sidewall terminals 55a, 55b.

Figure 4:
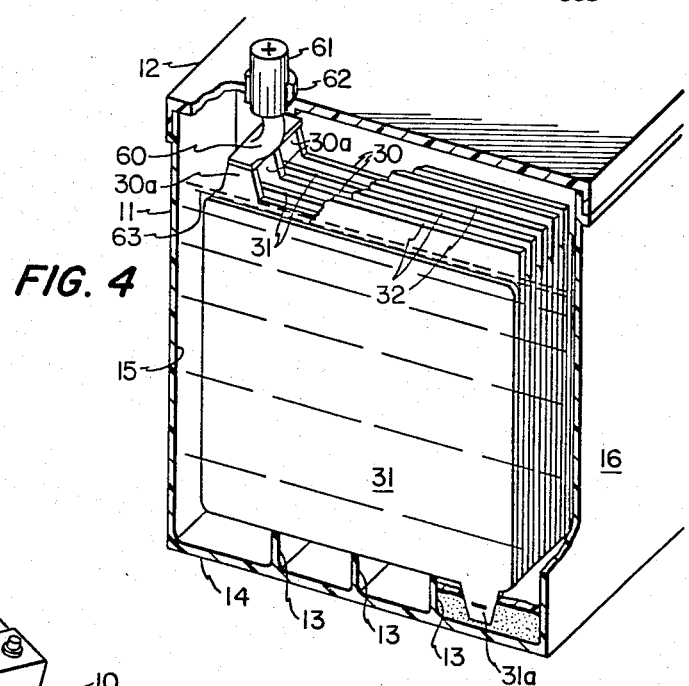
FIG. 4 is a partial end view of another embodiment of the present invention illustrating the manner of utilizing battery terminal posts extending through the top cover of the battery.

In the event a top terminal battery of the type shown in FIG. 4 is desired, the construction is basically the same except the lugs 30a associated with positive plates in one end compartment and the lugs 31a associated with the negative plates in the other end compartment respectively are positioned "lugs up". A bus or lead strap 60 is soldered or welded to the tops of the lugs, for example in the manner shown with respect to the lugs 30a (FIG. 4) to electrically connect all the positive plates 30 together and also to connect all the negative plates 31 together. A terminal 61 is affixed in electrical contact with the bus or lead strap and is in a position to extend through a bushing 62 in the cover 21.

In all cases of battery assembly, the cover 12 is secured onto the top of case 11 utilizing well known techniques to mechanically secure and effectively seal the cover to the battery case. It is significant to note that the only seal present in batteries fabricated in accordance with the present invention are positioned above the acid level 63 (FIG. 4) in the battery 10 and thereby avoids the significant problem of acid leakage inherent in some of the prior art batteries.

Now that the principles of the invention have been described and several embodiments disclosed, modifications will be obvious to those skilled in the art and such modifications are intended to be within the scope of the following claims:

What is claimed is:

1. A method for manufacture of a storage battery of the type including a one piece case integral below the acid level of the battery having spaced partitions extending upward from the bottom of the case which define with walls of the case a plurality of liquid tight cell compartments, and spaced rest ups extending respectively from the bottom of the case and tranversely to the partitions to provide means for supporting lugged positive and negative plates of the battery comprising the steps of:

establishing one opening in each partition adjacent the bottom portion thereof at one end of each partition and below the tops of the spaced rest ups, the openings being established alternatively at the front and the back of adjacent partitions between a side wall of the case and an adjacent rest up to provide fluid communication between adjacent cell compartments;

adding a mobile electrically-conductive material into the ends of said cell compartments to a level below the tops of the rest ups and at least to the height of the openings for flow through said openings to establish beds of conductive material between adjacent cell compartments; and placing a stack of battery plates in each cell compartment and locating lugs of the plates in the beds of conductive material, the lugs of the negative plates being at one end of a cell compartment and the lugs of the positive plates being at an opposite end of that cell compartment.

2. The method of claim 1 in which said mobile electrically-conductive material is a low melt alloy added to said ends in a molten state.

3. The method of claim 2 in which, while supporting with the partitions said stacks of plates, said mobile electrically conductive material is fused to a solid body by cooling the alloy to below its melting point.

4. The method of claim 1 in which said mobile electrically-conductive material is comprised of finely divided particles of conductive material selected from the class consisting of lead, low melt lead based alloys and copper.

5. The method of claim 4 in which the case is vibrated during the placement of the stacks of plates to facilitate location of the plate lugs into the beds of conductive material.

6. The method of claim 4 in which while supporting with the partitions said stacks of plates in vertical orientation said mobile electrically conductive material is fused to a solid body by applying heat to said particles to at least sinter said particles one to another.

7. The method of claim 4 in which a nonconductive material is applied over the top of said particles to provide a non-permeable layer over said particles.

8. The method of claim 7 in which said material is an insulator.

9. The method of claim 8 in which said material is an epoxy resin poured over the bed of said particles.

10. The method of claim 1 in which at least the ends of the case in which the mobile electrically conductive material is to be added are exposed to a heated medium and the mobile material is then added to the ends in a molten state.

11. The method of claim 1 in which the temperature of the heated medium does not exceed 225° F.

12. The method of claim 11 in which the mobile material is an alloy having a melting point of about 210° F.

13. The method of claim 12 in which the alloy is comprised of 8% cadmium, 40% bismuth and 52% lead.

* * * * *